Patented Oct. 7, 1924.

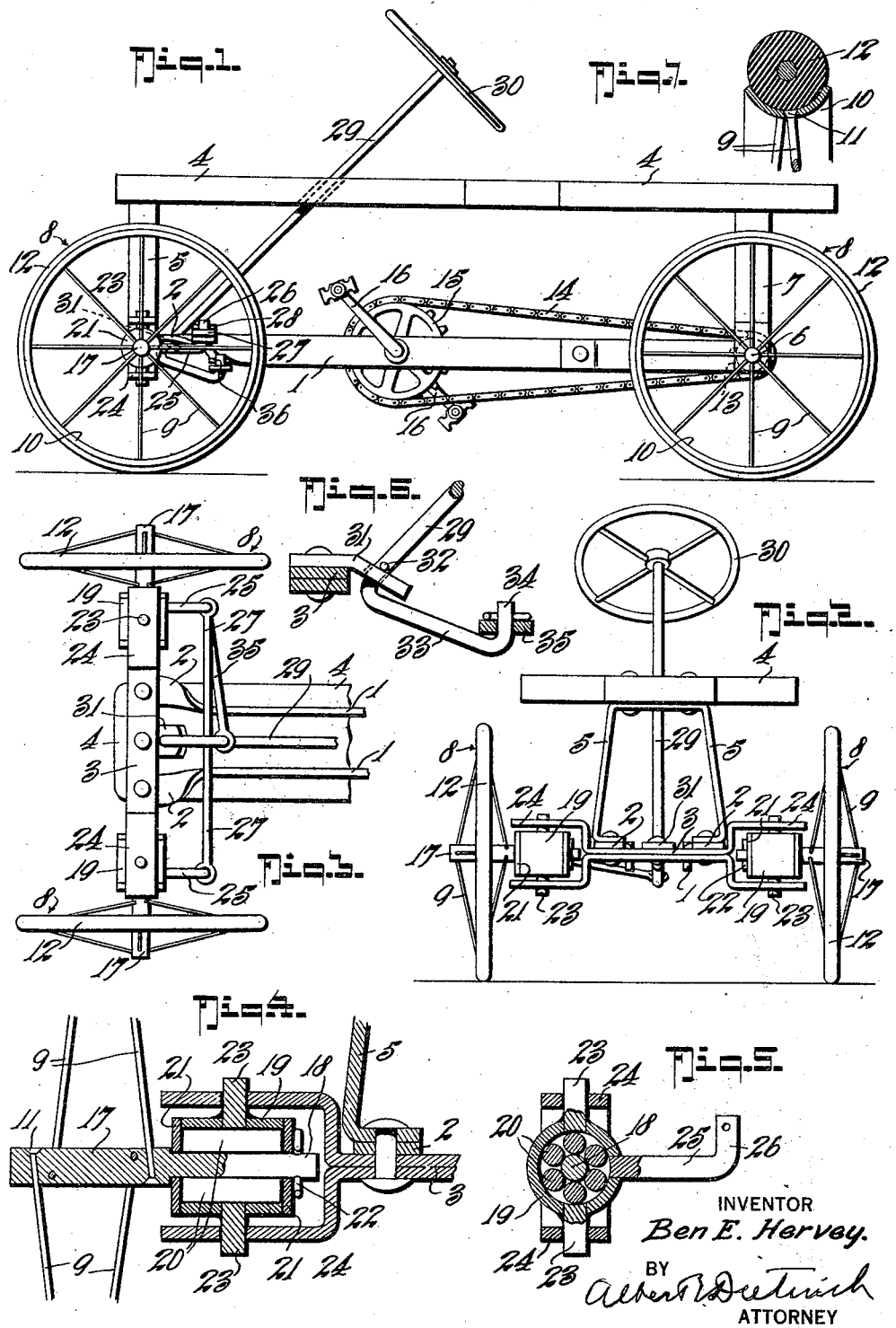

1,510,888

UNITED STATES PATENT OFFICE.

BEN E. HERVEY, OF WILMINGTON, CALIFORNIA.

TOY VEHICLE.

Application filed February 28, 1924. Serial No. 695,806.

*To all whom it may concern:*

Be it known that I, BEN E. HERVEY, a citizen of the United States, residing at Wilmington, in the county of Los Angeles and State of California, have invented a new and Improved Toy Vehicle, of which the following is a specification.

The invention relates to certain new and useful improvements in toy vehicles and has for its object to provide a vehicle of the type stated which will be particularly adaptable to use by and attractive to children.

More particularly the invention has for its object to provide a vehicle of the character stated in which special features of front axle, wheel, and steering mechanism construction are embodied such as will be particularly attractive to children and which are so constructed and cooperatively arranged as to provide a vehicle adaptable to use as a coaster or for moving about under mechanical power applied by the child operating the same, and one which is very simple and inexpensive to manufacture.

With the above and other objects in view the invention further resides in those novel details of construction, combination and arrangement of parts, all of which will be first fully described, then be particularly pointed out in the appended claims, reference being had to the accompanying drawing, in which:—

Figure 1 is a side elevation of the invention.

Figure 2 is a front elevation of the invention.

Figure 3 is an inverted plan view of the front axle, wheels, and the steering devices.

Figure 4 is an enlarged vertical longitudinal section of one of the front wheel spindle connections.

Figure 5 is a cross section of the parts shown in Figure 4, the section being taken through the plane of the casing trunnions.

Figure 6 is a detail cross section illustrating the manner of mounting and connecting the lower end of the steering post.

Figure 7 is an enlarged cross section of one wheel rim.

In carrying out my invention, I provide a pair of oppositely disposed flat frame bars 1 which are bent horizontally at their front ends as at 2 and are secured to the front axle forming bars 3 in the manner illustrated in Figures 2 and 3 of the drawings.

A suitable operator's support or seat 4 may be provided and suitably supported at its front end by the brace frame 5 which is secured thereto at its upper end, and which has its lower portions secured to the axle forming bars 3 by the same securing means which secure the horizontal portions 2 of the frame bars 1 thereto. It will be observed, by reference to Figure 2 of the drawing, that the sides of the brace frame 5 are not parallel but converge upwardly. By thus constructing the brace frame 5, a very rigid support for the seat is provided such as will not readily collapse under lateral strains.

The rear axle is generally designated 6 and the seat 4 is supported there above by a suitable brace frame 7.

The wheels 8 of the vehicle are secured to their cooperative shaft portions by having the spokes 9 passed through the rim 10 of the wheels and the said shaft sections, the said spokes being headed over, as at 11, to secure the same in position, see Figures 4 and 7. The wheel rims may be provided with the usual rubber tires 12.

My invention may be used as a coaster vehicle or may be provided with power transmission devices whereby the same may be propelled mechanically by the operator. The vehicle may be provided with a small sprocket 13 secured upon the rear axle 6 and for being driven through the medium of the chain transmission 14 which takes thereover and over the large sprocket 15 which has suitable bearing in the opposite frame bars 1 and which is provided with the usual crank portions 16.

The front wheels of the vehicle are each provided with an individual short length spindle 17 to which the said wheels are secured in the manner hereinbefore described, and which include a reduced portion 18 adapted to pass through the tubular roller bearing casing 19, suitable bearing rollers 20 being provided to surround the said reduced portion and provide an antifriction bearing therefor. End washers or keeper plates 21 are provided to prevent displacement of the bearing rollers 20 and these keeper plates are held to position, against displacement, by the shoulder formed by the reduced portion 18 and the cotter pin 22, see Figures 4 and 5.

Vertically disposed trunnion members 23 are secured, by brazing or otherwise, to project upwardly and downwardly from each casing 19 to have suitable bearing in the knuckle bearing portions 24 provided by the extended and bent ends of the front axle forming bars 3, see Figures 2, 4 and 5. Each of the casings 19 also has secured thereto to project therefrom a spindle arm 25 which includes an up-turned end 26 adapted to receive an apertured ear of the connector rod 27, cotter pins 28 serving to hold the ends of the connector rod to position upon the said up-turned ends.

A steering post 29 is provided which has mounted thereupon the usual steering wheel 30, the said post extending downwardly through the seat 4 and having its lower end passing through, to have bearing in, the rearwardly extended bracket 31 secured to the cross bars 3. After passing through the bearing bracket 31 the steering post is bent rearwardly, as at 33, and upwardly, as at 34, to provide a steering crank and for accommodating the apertured ear of the actuating rod 35, one end of which is secured thereto, the other end being secured to the upturned end 26 of one of the spindle arms 25. A cotter pin 36 may serve to secure the apertured ear of the rod 35 upon the upturned end 34, and a similar pin 32 may be provided for cooperating with the bracket 31 in holding the steering post against downward movement, see Figures 1, 3 and 6.

In the structure shown and described, a vehicle is disclosed which will be especially adapted for use by and attractive to children. An attractive automobile type steering means is provided, which is of a structure which, while very effective and practical in its operation, is such as will be so simple and inexpensive to construct as to be practical for use in a toy.

The special construction and arrangement of the short length spindles, the manner of constructing the wheel directly therewith, the bearings provided for the spindles and the steering devices provide a vehicle of the type stated which is of such simple construction as will render the manufacture thereof very inexpensive.

From the foregoing description, taken in connection with the accompanying drawing, it is thought the novel details of construction, manner of arrangement, and the advantages of my invention will be readily apparent to those skilled in the art to which is relates.

What I claim is:

1. In a vehicle of the class described wherein is provided a rear axle and wheels and a frame including opposing frame bars; front axle forming bars secured to the frame bars, front wheels, an individual spindle for each wheel, a bearing member for each wheel spindle pivotally mounted between the ends of the front axle forming bars, pins for holding the spindles against displacement, and means for turning the pivoted bearing members to steer the vehicle.

2. In a vehicle of the class described wherein is provided a rear axle and wheels, an operator support and a frame structure which includes opposing frame bars; front axle forming bars secured to the frame bars, a brace frame securing the axle forming bars and the operator support together, a single means for securing the engaging portions of the axle forming bars, the frame bars and the brace frame, front wheels, an individual spindle for each wheel, a bearing member for each wheel spindle pivotally mounted between the ends of the front axle forming bars, pins for holding the spindle against displacement, and means for turning the pivoted bearing members to steer the vehicle.

3. In a vehicle of the class described wherein is provided a rear axle and wheels, an operator support and a frame structure which includes opposing frame bars; front axle forming bars secured to the frame bars, a brace frame securing the axle forming bars and the operator support together, the opposite sides of said brace frame being out of parallel one with the other, a single means for securing the engaging portions of the axle forming bars, the frame bars and the brace frame, front wheels, an individual spindle for each wheel, a bearing member for each wheel spindle pivotally mounted between the ends of the front axle forming bars, means for securing each spindle from displacement with relation to its bearing member, and means for turning the pivoted bearing members to steer the vehicle.

4. In a vehicle of the class described, a pair of axle forming bars having their ends separated and their intermediate portions in contact, means for securing said bars in parallelism, the separated ends of said bars including parallel portions having vertical bearing apertures, spindle carrying members having trunnion bearings mounted in said apertures between the separated ends of the axle bars, means for connecting the respective spindle carrying members together to move in unison and wheels having spindles mounted in said carrying members.

5. In a device of the class described wherein is provided a rear axle and wheels and a frame structure which includes opposing frame bars; front axle forming bars secured to the frame bars, front wheels, an individual spindle for each wheel, a bearing member for each wheel spindle pivotally mounted between the end of the front axle forming bars, pins for holding the spindles against displacement, means for turning the pivoted bearing members to steer the vehicles, the said steering means including a steering post bent rearwardly and upwardly at its lower end to form a crank, spindle arms secured to and projected rearwardly from the pivoted bearing members, a connector rod connecting the spindle arms, an actuator rod connecting the steering post crank with one spindle arm, and cotter pins for holding the several rods against displacement.

BEN E. HERVEY.